United States Patent [19]

Imada et al.

[11] 4,302,307

[45] Nov. 24, 1981

[54] METHOD FOR THE IMPROVEMENT OF GRAMOPHONE RECORDS

[75] Inventors: Kiyoshi Imada, Omiya; Susumu Ueno, Ibaragi; Tokuji Abe, Omiya, all of Japan

[73] Assignee: Shin-Etsu Chemical Co. Ltd., Japan

[21] Appl. No.: 60,502

[22] Filed: Jul. 25, 1979

[30] Foreign Application Priority Data

Jul. 27, 1978 [JP] Japan ................................. 53-91906

[51] Int. Cl.$^3$ ............................................... C07C 3/24
[52] U.S. Cl. ........................................ 204/169; 427/40
[58] Field of Search ....................... 427/38, 39, 40, 41; 274/41 A, 41 R, 42 R; 204/165, 169

[56] References Cited

U.S. PATENT DOCUMENTS 3,901,994  8/1975  Mehalso et al. ...................... 427/39
3,959,104  5/1976  Fales ................................. 204/165

OTHER PUBLICATIONS

Cuomo et al. "IBM Tech. Disc. Bull." V. 20, No. 9, Feb. 1978, p. 3785.

*Primary Examiner*—John H. Newsome
*Attorney, Agent, or Firm*—McGlew and Tuttle

[57] ABSTRACT

Gramophone records made of a vinyl chloride based resin are subjected to a treatment with low temperature plasma of a gas having no polymerizability in the plasma condition. A markedly improved anti-static effect is imparted to the surface of the gramophone record which also becomes highly resistant to wearing so that the signal/noise ratio in playing of the gramophone record is remarkably improved even after many times of repeated playing of the record.

3 Claims, No Drawings

METHOD FOR THE IMPROVEMENT OF GRAMOPHONE RECORDS

BACKGROUND OF THE INVENTION

The present invention relates to a method to improve gramophone records or, in particular, to a method for improving the surface properties of gramophone records fabricated with a vinyl chloride based synthetic resin.

As is known, most of today's gramophone records are made of thermoplastic synthetic resins. Such records typically include vinyl chloride based resins such as a copolymeric resin of vinyl chloride and vinyl acetate.

In addition to rather weak resistibility to wear and tear, one of the faults of the gramophone records of vinyl chloride based resins is the accumulation of an electrostatic surface charge which attracts floating dust particles in the air. This phenomenon causes soiling of the record surface and rapidly increases noise generation upon repeated playing of the records.

Various attempts have been made to devise an effective way or method to improve the surface properties of the gramophone records made of vinyl chloride based synthetic resins, including several chemical means with which the electrostatic charge on the surface can be reduced and by which the mechanical strength or, particularly, the resistance of the surface against wear and tear can be enhanced in a relatively simple and convenient manner without substantially increasing the production costs of the gramophone records.

Despite intensive efforts toward the above end, no solution, economic or otherwise, has yet been found to the above problem to obtain durable benefits of the improvement of the surface properties of the gramophone records made from vinyl chloride based resins.

For example, effect against electricity static on the surface of the record is obtained, though temporarily, by spraying a certain surfactant containing solution on the record's surface. The durable effect against static, however, is very limited.

SUMMARY OF THE INVENTION

It is, therefore, an object of the present invention to provide a simple and convenient method for improving the surface properties of the gramophone records fabricated with a vinyl chloride based synthetic resin. In particular, the inventive technique increases the wear and tear resistance of the record's surface while decreasing the tendency to accummulate electrostatic charges on the surface and thereby decreases noise generation after repeated playing of gramophone records.

The method of the present invention for improving the surface properties of the gramophone records fabricated with a vinyl chloride based synthetic resin, comprises exposing the surface of the gramophone record to a low temperature plasma atomsphere of gas having no polymerizability in the plasma condition under a pressure ranging from $10^{-3}$ Torr to 10 Torr.

DETAILED DESCRIPTION OF THE PREFERRED EMBODIMENTS

As explained above, the gramophone records treated by the inventive techniques are those fabricated with a vinyl chloride based synthetic resin, for example a homopolymeric poly-vinyl chloride resin as well as various kinds of copolymeric resins of which the major component, for example, 50% by weight or more, is vinyl chloride. Particularly the record materials which are susceptible to effective treatment by the inventive technique include, most of the synthetic resins use to fabricate gramophone records such as copolymeric resins of vinyl chloride with several kinds of comonomers such as vinyl esters, e.g. vinyl acetate, olefins, e.g. ethylene and propylene, acrylic monomers, e.g. acrylic acid, methacrylic acid and esters thereof, and the like.

It is, of course, optional that two or more kinds of these comonomers are simultaneously copolymerized with vinyl chloride according to need. Various kinds of graft copolymers mainly composed of vinyl chloride are also suitable for the fabrication of gramophone records as the objective material of the method of the present invention.

The formulation of the resin compositions suitable for the fabrication of gramophone records is well known in the art. Any additives, conventionally used in the art, may be added into the resin compositions to produce the gramophone records in accordance with the inventive method including plasticizers, agents against static, stabilizers, lubricants and the like.

The plasticizers are exemplified by ester compounds such as phthalic esters, esters of aliphatic dibasic carboxylic acids, esters of aliphatic monocarboxylic acids, glycol esters, esters of phosphoric acid, e.g. tricresyl phosphate and triphenyl phosphate, esters of citric acid and the like as well as epoxy-based plasticizers, polyester type plasticizers, urethane-based plasticizers and reactive plasticizers.

The anti-static agents are exemplified by cationic surface active agents such as primary amine compounds, tertiary amine compounds, quaternary ammonium compounds and pyridine derivatives. They are also exemplified by anionic surface active agents such as soaps, sulfonated oils, sulfonated ester oils, sulfonated amide oils, ester salts of sulfonated olefins, salts of sulfuric acid esters of aliphatic alcohols, ester salts of alkyl sulfuric acids, salts of ethyl carboxylate sulfonic acids, salts of alkyl sulfonic acids, salts of naphthalene sulfonic acids, salts of benzene sulfonic acids, succinic ester sulfonic acids and esters of phosphoric acid, e.g. long-chained alkyl phosphates; nonionic surface active agents such as carboxylic acid esters of polyvalent alcohols, various addition products of ethylene oxide with aliphatic alcohols, aliphatic carboxylic acids, aliphatic amino compounds, aliphatic amide compounds, alkylphenols, alkylnaphthols and partial carboxylic acid esters of polyvalent alcohols, and polyethylene glycols; and amphoteric surface active agents such as carboxylic acid derivatives and imidazoline derivatives.

Further, the stabilizers are exemplified by metal soaps such as calcium stearate, zinc stearate, cadmium stearate, lead stearate and barium stearate; organic tin compounds such as dibutyltin dilaurate, di-n-octyltin dimaleate and di-n-octyltin mercaptide and lead compounds such as tribasic lead sulfate and dibasic lead phosphite. And lubricants are exemplified by ester compounds such as butyl stearate and by aliphatic amide compounds such as ethylene bisstearoamide, higher fatty acids and esters therof, polyethylene waxes and the like.

In addition to the above, any kind of additives conventionally used in the formulation of vinyl chloride based resin compositions for shaped articles may be formulated without specific limitations including fillers, anti-oxidants, ultraviolet light absorbers, anti-fogging agents, pigments, dyestuffs and crosslinking aids.

The surface active agents above mentioned which serve as an anti-static agent may be formulated in the resin compositions in an amount of 0.03 to 1 part by weight per 100 parts by weight of the vinyl chloride based resin in order to obtain good anti-static effect.

In the inventive method, the gramophone records fabricated with the above described resin compositions of vinyl chloride based resins and various additives are subjected to a treatment with low temperature plasma of a gas having no polymerizability in the plasma condition. Low temperature plasma, as used herein, is well known in the art as a gaseous atmosphere full of electrically charged species, where the temperature of the gaseous atmosphere is not excessively high in comparison with the ambient temperature irrespective of the energies of the charged species per se. Low temperature plasma is produced mainly by glow discharge in a gaseous atmosphere of a pressure in the range from 0.001 to 10 Torr where the frequency of the electric power supply for the discharge is not limitative ranging from direct current to the microwave region. In particular, a frequency of the so-called high frequency region is recommended due to the possibility of obtaining stable plasma discharge. For example, a frequency of 13.56 MHz or 27.12 MHz is recommended since these frequencies are relatively free from statutory regulations for radio waves.

The shapes and arrangement of the electrodes are not limited insofar as a stable plasma discharge can be ensured within the space in which the surface of the gramophone record is treated with, i.e. exposed to, the plasma atmosphere. Thus, a pair of inside electrodes, a pair of exterior electrodes and a coiled electrode may be used according to particular types of apparatuses for plasma generation. The electrodes may be connected to the high frequency generator either by capacitive coupling or by inductive coupling.

The intensity or power density of the low temperature plasma and the time for the plasma treatment are interrelated parameters, but extreme difficulties arise when defining the power density of low temperature plasma explicitly. This is because of the complex nature of the plasma atmosphere which is beyond the understanding in the present status of the art. Therefore, it is best to determine the time for the plasma treatment in advance. The plasma treatment time can be determined by a careful preparatory experiment with a test record in which several parameters, including the supplied electric power, are selected for the particular lot of the gramophone records under production. With a power density obtained in most of the currently available apparatuses for plasma generation, a time ranging between a few seconds and several tens of minutes is usually sufficient to obtain the objective effect of the inventive method. At any rate, it is a least requirement that the surface of the gramophone record under the plasma treatment never undergoes thermal degradation by the heat evolved by the plasma discharge.

The other parameters that should be considered in the plasma treatment are the kind of gaseous constituents and the pressure of the gaseous atmosphere. To ensure stability of the plasma discharge the pressure of the gaseous atmosphere within the apparatus for plasma generation should be maintained in a range from 0.001 to 10 Torr or, preferably, from 0.01 to 1.0 Torr.

The gases to fill the apparatus for plasma generation should have no polymerizability in the plasma condition since deposition of polymerized matter on the surface of the gramophone record is undesirable. In this connection, the gases are selected from such inorganic or inert gases as helium, neon, argon, nitrogen, nitrous oxide, nitrogen dioxide, oxygen, air chlorine, hydrogen chloride, carbon monoxide, carbon dioxide, hydrogen and the like. These gases may be used either singly or as a mixture of two or more. Among the abovementioned gases, argon or an argon-containing mixed gas is preferred because of higher efficiency for an unknown reason.

By the treatment with low temperature plasma as described above, the surface of the gramophone record is imparted with enhanced affinity to water so that, when an anti-static agent has been employed, further remarkable anti-static effect is obtained by the synergism of the anti-static agent and the plasma treatment. Moreover, crosslinks are formed in the surface layer of the plasma-treated gramophone record with which bleeding of the plasticizers, anti-static agents and the like on the surface is effectively prevented so that durability in the above mentioned effect as well as improvement in the wear and tear resistance of the surface of the gramophone record can be obtained.

Following are examples to illustrate the method of the present invention in further detail:

EXAMPLE 1

A resin composition was prepared with the formulation composed of 100 parts by weight of a copolymeric resin with an average degree of polymerization of about 400 composed of vinyl chloride and vinyl acetate in a weight ratio of 88:12 (SC-400G, a product name of Shin-Etsu Chemical Co., Japan), 1.0 part by weight of an expoxy-modified soybean oil, 0.2 part by weight of a surface active agent (Catanac SN, a product name of American Cyanamid Co.), 1.0 part by weight of dibutyltin mercaptide and 0.3 part by weight of calcium stearate. And this resin composition was shaped into gramophone records in a moulding machine for gramophone records with preheating at 140° C. and pressing at 165° C.

The thus fabricated gramophone record was placed in an apparatus for plasma generation, in which low temperature plasma was generated by supplying a high frequency electric power of 50 watts at a frequency of 13.56 MHz for 5 minutes while the pressure in the apparatus was maintained at 0.2 Torr by passing argon gas with simultaneous evacuation with a pump.

S/N (Signal/noise) ratios in playing of this plasma treated surface of the gramophone record were determined in the lead-in portion and in the lead-out portion for the first playing and after 100 times of playing to effect wearing of the surface. The results were compared with the S/N ratios of untreated gramophone record as shown in Table 1 below

TABLE 1

| Plasma treatment | Lead-in portion | | Lead-out portion | |
| --- | --- | --- | --- | --- |
| | Initial | After wearing | Initial | After wearing |
| No | 56.0 dB | 53.5 dB | 57.0 dB | 55.0 dB |
| Yes | 56.0 dB | 56.0 dB | 57.2 dB | 57.0 dB |

As is clear from the results shown in the table, the plasma treated gramophone record exhibits greater stability in the S/N ratio than the untreated record and remarkable improvement in the anti-wearing resistance under repeated playing.

EXAMPLE 2

A gramophone record, fabricated in the same manner as in the preceding example, was placed in the apparatus for plasma generation. Low temperature plasma was generated in the apparatus by supplying a high frequency electric power of 80 watts at a frequency of 13.56 MHz for 5 minutes. The pressure in the apparatus was maintained at 0.3 Torr by passing nitrogen gas with simultaneous evacuation with a pump.

The results of the S/N ratio measurements carried out with this plasma treated gramophone record in the same manner as in Example 1, are set out in Table 2 below together with the results for the untreated record.

TABLE 2

| Plasma treatment | Lead-in portion | | Lead-out portion | |
|---|---|---|---|---|
| | Initial | After wearing | Initial | After wearing |
| No | 55.8 dB | 54.0 dB | 56.7 dB | 54.4 dB |
| Yes | 55.7 dB | 55.5 dB | 56.9 dB | 56.8 dB |

EXAMPLE 3

A gramophone record, fabricated in the same manner as in Example 1, was placed in the apparatus for plasma generation. Low temperature plasma was generated in the apparatus by supplying a high frequency electric power of 100 watts at a frequency of 13.56 MHz for 5 minutes. The pressure in the apparatus was maintained at 0.1 Torr by passing a mixed gas of carbon monoxide and argon in a mixing ratio of 85:15 by volume with simultaneous evacuation with a pump.

The results of the S/N ratio measurements, carried out with this plasma treated gramophone record in the same manner as in Example 1, are set out in Table 3 below together with the results for the untreated records.

TABLE 3

| Plasma treatment | Lead-in portion | | Lead-out portion | |
|---|---|---|---|---|
| | Initial | After wearing | Initial | After wearing |
| No | 56.1 dB | 54.0 dB | 56.8 dB | 54.5 dB |
| Yes | 55.9 dB | 55.8 dB | 56.7 dB | 56.5 dB | cl EXAMPLE 4

A resin composition was prepared by blending 70 parts by weight of a copolymeric resin with an average degree of polymerization of about 500 composed of vinyl chloride and vinyl acetate in a weight ratio of 87.5:12.5 (SC-500T, a product name of Shin-Etsu Chemical Co.), 30 parts by weight of homopolymeric vinyl chloride resin with an average degree of polymerization of about 700 (TK-700, a product name of Shin-Etsu Chemical Co.), 1.0 part by weight of an expoxy-modified soybean oil, 1.0 part by weight of dibutyltin mercaptide and 0.3 part by weight of calcium stearate. This resin composition was shaped into gramophone records under the same conditions as in Example 1.

The thus fabricated gramophone record was placed in an apparatus for plasma generation, in which low temperature plasma was generated by supplying a high frequency electric power of 150 watts at a frequency of b 13.56 MHz for 5 minutes while the pressure in the apparatus was maintained at 0.7 Torr by passing argon with simultaneous evacuation with a pump.

The results of the S/N ratio measurements, carried out with this plasma treated gramophone record in the same manner as in Example 1, are set out in Table 4 below together with the results for the untreated record.

TABLE 4

| Plasma treatment | Lead-in portion | | Lead-out portion | |
|---|---|---|---|---|
| | Initial | After wearing | Initial | After wearing |
| No | 56.2 dB | 53.8 dB | 57.3 dB | 54.7 dB |
| Yes | 56.4 dB | 56.2 dB | 57.1 dB | 56.8 dB |

What is claimed is:

1. A method for the improvement of the surface properties of a gramophone record made of vinyl chloride based resin which comprises exposing the gramophone record to a low temperature plasma atmosphere of a gas having no polymerizability in the plasma condition under a pressure in the range from 0.001 Torr to 10 Torr, wherein said gas having no polymerizability in the plasma condition is selected from the group consisting of helium, neon, argon, nitrogen, nitrous oxide, nitrogen dioxide, oxygen, air, chlorine, hydrogen chloride, carbon monoxide, carbon dioxide and hydrogen.

2. The method as claimed in claim 1 wherein the pressure is in the range from 0.01 Torr to 1.0 Torr.

3. The method as claimed in claim 1 wherein the low temperature plasma is generated by supplying a high frequency electric power.

* * * * *